(12) United States Patent
Kar et al.

(10) Patent No.: US 10,284,892 B2
(45) Date of Patent: May 7, 2019

(54) DETERMINING VIDEO ADVERTISEMENT QUALITY

(71) Applicant: ADOBE SYSTEMS INCORPORATED, San Jose, CA (US)

(72) Inventors: Wreetabrata Kar, San Jose, CA (US); Viswanathan Swaminathan, Saratoga, CA (US)

(73) Assignee: Adobe Inc., San Jose, CA (US)

( * ) Notice: Subject to any disclaimer, the term of this patent is extended or adjusted under 35 U.S.C. 154(b) by 82 days.

(21) Appl. No.: 14/932,644

(22) Filed: Nov. 4, 2015

(65) Prior Publication Data

US 2017/0127108 A1   May 4, 2017

(51) Int. Cl.
| | |
|---|---|
| *H04N 21/433* | (2011.01) |
| *H04N 21/2668* | (2011.01) |
| *H04N 21/81* | (2011.01) |
| *H04N 21/44* | (2011.01) |
| *H04N 21/466* | (2011.01) |
| *H04N 21/45* | (2011.01) |
| *H04N 21/258* | (2011.01) |
| *H04N 21/262* | (2011.01) |
| *G06Q 30/02* | (2012.01) |

(52) U.S. Cl.
CPC ......... *H04N 21/2668* (2013.01); *G06Q 30/02* (2013.01); *H04N 21/25883* (2013.01); *H04N 21/25891* (2013.01); *H04N 21/26241* (2013.01); *H04N 21/44008* (2013.01); *H04N 21/4532* (2013.01); *H04N 21/4667* (2013.01); *H04N 21/812* (2013.01); *H04N 21/4331* (2013.01)

(58) Field of Classification Search
CPC .................................................. H04N 21/4331
See application file for complete search history.

(56) References Cited

U.S. PATENT DOCUMENTS

| | | | |
|---|---|---|---|
| 9,088,823 B1 * | 7/2015 | Price ................... | H04N 21/4667 |
| 2012/0130805 A1 * | 5/2012 | On ...................... | G06Q 30/0251 |
| | | | 705/14.49 |
| 2013/0174045 A1 * | 7/2013 | Sarukkai .......... | H04N 21/23439 |
| | | | 715/744 |

\* cited by examiner

*Primary Examiner* — Michael H Hong
(74) *Attorney, Agent, or Firm* — Shook, Hardy & Bacon, L.L.P.

(57) ABSTRACT

Embodiments of the present invention relate to facilitating determining video advertisement quality. In embodiments, video advertisement data associated with a video advertisement or presentation of the video advertisement in association with a video is referenced. Such video advertisement data can indicate, for example, an advertisement characteristic, a video characteristic, a video session characteristic, and/or a viewer characteristic. The video advertisement data can be used to determine an advertisement quality associated with the video advertisement. The advertisement quality generally indicates a probability a viewer will continue viewing a portion of the video following presentation of the video advertisement presented in association with the video.

19 Claims, 6 Drawing Sheets

DETERMINING VIDEO ADVERTISEMENT QUALITY

BACKGROUND

Advertisements presented during videos have increasingly been used as a form of revenue for publishers of the video. In many cases, these advertisements viewed during a video cause a viewer to abandon further viewing of the online video, for example, due to a lack of interest in the advertisement, annoyance of the advertisement, or the like. In video advertisements, however, the revenue of a video publisher of the online video generally depends on the number of video advertisements shown. As such, retention of viewers during these advertisements can be critical as higher retention leads to greater viewer engagement with videos and, consequently, enhanced opportunities to show more advertisements.

Generally, in digital advertising, a common metric for measuring and selecting advertisements is based on a click through rate (CTR), conversion rate, or other pay-per-action pricing policies. Although this measure can be appropriate for search advertisements, such a metric is insufficient for video advertisements for various reasons. For example, with video advertisements, an advertisement objective may be for branding or to be informative without requiring a click or conversion, resulting in a low frequency of clicks and conversions. Further, such conventional pay-per-action pricing policies do not take into account information relating to retention of a viewer to continue viewing a video rather than abandoning the video. Retention power of a video advertisement could affect the continuation of a viewer during the subsequent video advertisements during the same video session. Therefore, the advertisement revenue for video publishers is in many cases based on the effectiveness or the retention power of the advertisement and conventional pay-per-action pricing policies are not effective in describing the retention of a viewer.

Further, pay-per-action pricing policies generally use auction bids to select placement for an advertisement. In this manner, an advertisement associated with a higher auction bid might be allocated to a particular placement or position. Not only do traditional advertisement placement methods forego considerations of the retention power of the advertisement, but also the specific advertisement slot for which an advertisement is being placed. As such, with traditional pricing policies, an advertisement with a high auction bid but low viewer retention might be selected for a first advertisement slot resulting in a viewer to immediately discontinue viewing the video including the subsequent video advertisements.

SUMMARY

Embodiments of the present invention are directed to determining video advertisement quality and selecting video advertisements based on the advertisement quality. As described herein, advertisement quality generally refers to a capability measure of a video advertisement to retain a viewer such that the viewer continues to watch a portion of the video following presentation of the video advertisement. Various features associated with advertisements, videos, video sessions, and/or viewers can be analyzed in an effort to generate advertisement quality for video advertisements. Upon determining advertisement quality for video advertisements, the advertisement quality can be used to select one or more video advertisements to be presented in association with a video. In some cases, advertising costs, and even advertisement presentation position, can be used along with advertisement quality to select appropriate video advertisements for presentation in connection with the video. Using advertisement quality to select video advertisements for videos can increase viewer retention of a video, thereby increasing revenue opportunities for both publishers and advertisers.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Advertisements presented during videos have increasingly been used as a form of revenue for publishers of the video. In many cases, video advertisements are distributed throughout the video, with each video advertisement potentially being an additional source of revenue for the video publisher. For example, video advertisements, also commonly referred to as linear advertisements, are oftentimes presented before the video begins (i.e., "pre-roll"), as the video progresses (i.e., "mid-roll"), and upon completion of the video (i.e., "post-roll"). As such, with video advertisements, the revenue of a video publisher of an online video generally depends on the number of video advertisements shown. In particular, retention of viewers during these advertisements can be critical as higher retention leads to greater viewer engagement with videos and, consequently, enhanced opportunities to show more advertisements.

In many cases, however, these advertisements presented in association with a video cause a viewer to abandon further viewing of the online video. Video abandonment may occur due to a video advertisement for any number of reasons. For instance, viewers may choose to abandon viewing of a video due to a lack of interest in the advertisement, annoyance of the advertisement, or the like. Such video abandonment can result in a loss of revenue for both the video publisher and advertisers. By way of example only, assume that an online video includes a presentation of three video advertisements (e.g., one pre-roll, one mid-roll, and one post-roll advertisement). Further assume that a viewer selects to view the video and is presented with the first video advertisement. Because the viewer does not wish to continue viewing the advertisement in order to view the video, the viewer decides to discontinue watching the video. In such a case, the video publisher foregoes potential revenue associated with presentation of the second and third video advertisements. The advertiser associated with the second and third video advertisements also misses the opportunity to promote their products as the advertisements were not presented.

Because advertisement revenue for video publishers is in many cases based on the effectiveness or the retention power of the advertisement such that subsequent advertisements will be viewed by a viewer, conventional metrics for measuring and selecting advertisements is not effective for video advertisements. In particular, in digital advertising, a common metric for measuring and selecting advertisements is based on a click through rate (CTR), conversion rate, or other pay-per-action pricing policies. These conventional pay-per-action pricing policies do not take into account whether a viewer wishes to continue viewing a video after completion of the advertisement. Further, with video advertisements, a probability of clicks and conversions is considerably low, and the objective of a video advertiser may be for branding or to be informative without requiring a click or conversion. Accordingly, the conventional pay-per-action pricing policies do not provide valuable or reliable data to use in measuring and selecting video advertisements to include with a video.

As such, embodiments of the present invention are directed to determining video advertisement quality and using the video advertisement quality to select video advertisements for a video. In particular, as described herein, video advertisement quality is based on a capability of the video advertisement to retain a viewer such that the viewer continues watching the video as opposed to abandoning viewing the video. As such, a video advertisement quality, or video ad quality, provides an indication of retention effectiveness of the video advertisement. Various variables reflective of a viewer's decision to continue watching a video or abandon a video in association with a video advertisement are used to determine video advertisement quality. Such variables can be related to, for example, advertisement characteristics, video characteristics, video session characteristics, and/or viewer characteristics.

Video advertisement quality can be used to facilitate advertisement selection and/or advertisement positioning. In this regard, upon determining video advertisement quality(s) associated with a video advertisement(s), the video advertisement quality(s) can be used to select and/or place one or more video advertisements for presentation in connection with a video. In some cases, video advertisement quality can be assessed along with advertisement pricing to select video advertisements to include with a video. Further, because advertisement positioning in videos is important (e.g., when a viewer abandons viewing, subsequent ads in that video are not viewed), the effect of the position of the video advertisement within the video on video retention, can also be considered in selecting advertisements and advertisement placement. Video advertisement quality can also be used to evaluate pricing of advertisements and/or to measure success of a video advertisement, as described herein.

Figure 1:
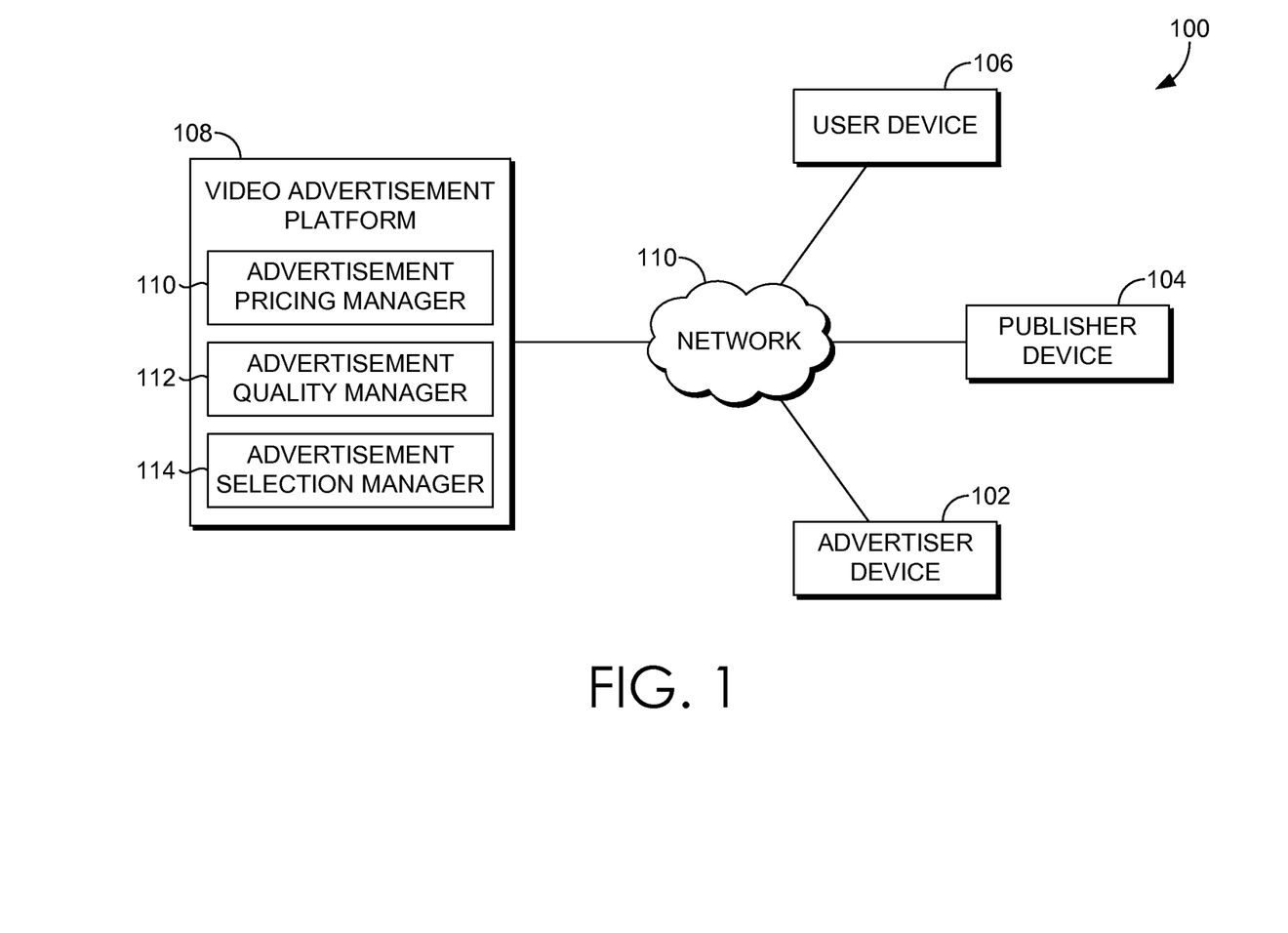
FIG. 1 is a block diagram of an exemplary operating environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as environment 100.

The environment 100 of FIG. 1 includes an advertiser device 102, a publisher device 104, user device 106, and video advertisement platform 108. Each of the advertiser device 102, a publisher device 104, user device 106, and video advertisement platform 108 may be, or include, any type of computing device (or portion thereof) such as computing device 800 described with reference to FIG. 8, for example. The components may communicate with each other via a network 110, which may include, without limitation, one or more local area networks (LANs) and/or wide area networks (WANs). Such networking environments are commonplace in offices, enterprise-wide computer networks, intranets, and the Internet. It should be understood that any number of advertiser devices, publisher devices, user devices, and video advertisement platforms may be employed within the environment 100 within the scope of the present invention. Each may comprise a single device or multiple devices cooperating in a distributed environment. For instance, the video advertisement platform 108 may be provided via multiple devices arranged in a distributed environment that collectively provide the functionality described herein. Additionally, other components not shown may also be included within the environment 100, while components shown in FIG. 1 may be omitted in some embodiments.

The advertiser device 102 is generally configured to provide video advertisements for including as advertisements in videos. As such, the advertiser device 102 can communicate with the video advertisement platform 108 to provide video advertisements as well as other data related to video advertisements. A video advertisement, as used herein, refers to an advertisement for inclusion, or that is included, in a video. In this way, a video advertisement may be presented at the beginning of a video (e.g., prior to the video starting), during the video (e.g., inserted in the middle of the video), or the ending of the video (e.g., upon completion of the video). A video advertisement is oftentimes in the form of a short video, but embodiments are not limited thereto. For instance, a video advertisement might be an image that is presented for a short duration of time. An advertiser may be an individual or a representative of a company, an association, an organization, an institution, etc. that facilitates submission of an advertisement, or data associated therewith, for use in electronic display. The advertiser device 102 may be any type of computing device owned and/or operated by an advertiser that can access network 110. For instance, the advertiser device 102 may be a desktop computer, a laptop computer, a tablet computer, a mobile device, or any other device having network access.

The publisher device 104 is generally configured to provide videos. In this regard, the publisher device 104 can communicate with the video advertisement platform 108 to provide videos and/or data associated therewith. Such videos communicated to the video advertisement platform 108 may be provided for analysis and/or for subsequent presentation to viewers. A video refers to a moving visual image and may be provided in any number of formats and lengths. A publisher may be an individual or representative of a company, an association, an organization, an institution, etc. that facilitates submission of a video, or data associated therewith, for use in electronic display. The publisher device 102 may be any type of computing device owned and/or operated by a video publisher that can access network 110. For instance, the publisher device 104 may be a desktop computer, a laptop computer, a tablet computer, a mobile device, or any other device having network access.

Video advertisements and videos, and data associated therewith, can be provided to the video advertisement platform 108 in any number of manners. For example, the advertiser device 102 may utilize an application or browser to provide video advertisements, while the publisher device 104 may utilize an application or browser to provide videos. Further, although illustrated herein as video advertisements and videos being provided to the video advertisement platform 108, as can be appreciated, video advertisements and/or videos can be provided to another system or component (e.g., content server) that facilitates the presentation of the video with the video advertisement. For example, another component or system might obtain an identification of a video and video advertisement(s) pairing and access and integrate the appropriate video and video advertisement(s). As yet another example, a publisher device may have the capability to use indications of video advertisement preferred selections and integrate the video advertisements with videos provided by the publisher.

The user device 106 may be any type of computing device owned and/or operated by a user or video viewer that can access network 110. For instance, the user device 106 may be a desktop computer, a laptop computer, a tablet computer, a mobile device, or any other device having network access. Generally, a user may employ the user device 106 to, among other things, access online videos. For example, the user may employ a web browser on the user device 106 to access and view online videos from the video advertisement platform 108 or one or more content servers (e.g., of a publisher). Such content servers may be any type of server device capable of hosting online videos from a publisher and serving the videos to computing devices, such as the user device 106. By way of example, and not limitation, a content server may be a server maintaining videos for a publisher website.

Space or advertisement slots may be provided in connection with a video for presenting video advertisements. In particular, when a user accesses a video, the video advertisement platform 108 may facilitate selection and delivery of a video advertisement(s) for presentation in connection with the video. In some embodiments, a web page having a video may be accessed by a user to view the video. In other cases, an application having a video may be accessed by a user to view the video. In any case, when a user requests a video or navigates thereto, the video advertisement platform 108 can select a video advertisement(s) for presentation during a slot(s) provided by or in connection with a video. The video and/or video advertisement may be provided by the video advertisement platform 108 or other component, such as a content server, to the user device 106. Upon the user device 106 obtaining the video and/or selected video advertisement(s), the user device 106 (e.g., via a browser or application) can cause display such that the user of the user device 106 can view the video and corresponding video advertisement(s).

The video advertisement platform 108 is generally configured to facilitate selection of a video advertisement(s) for presentation in association with a video. In accordance with embodiments described herein, the video advertisement platform 108 can include advertisement quality manager 112, advertisement selection manager 114, and advertisement pricing manager 116. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Each of the advertisement quality manager 112, the advertisement selection manager 114, and the advertisement pricing manager 116 may be any type of computing device, or incorporated into a computing device, owned and/or operated by an advertiser or a publisher, or a representative thereof, that can access a network (e.g., network 110). Generally, an advertiser, a publisher, and/or a third-party in association therewith may employ the advertisement platform 108 to, among other things, manage video advertisement selection.

At a high level, in accordance with embodiments of the present invention, the advertisement quality manager 112 is generally configured to determine advertisement quality. In particular, the advertisement quality manager 112 can determine a metric that indicates a retention effectiveness with respect to a video advertisement. The advertisement selection manager 114 utilizes advertisement quality to select a video advertisement(s) to use in connection with a presentation of a video. As described herein, the advertisement selection manager 114 may also operate to determine placement of video advertisements relative to the video (e.g., first advertisement slot, second advertisement slot, etc.) The advertisement pricing manager 116 is generally configured to facilitate determining a price for the advertiser to pay for presenting the video advertisement in association with a video.

Figure 2:
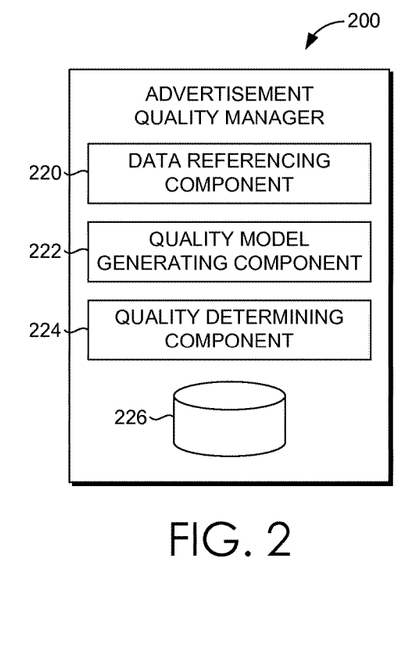
FIG. 2 is a block diagram of an advertisement quality manager, in accordance with an embodiment of the present invention.

Turning now to FIG. 2, FIG. 2 illustrates an exemplary advertisement quality manager 212. As described, the advertisement quality manager 212 is configured to determine or generate quality of video advertisements. In this regard, the advertisement quality manager 212 can facilitate determination of an advertisement quality metric that measures the quality of a video advertisement. In accordance with embodiments described herein, the advertisement quality or advertisement quality metric is directed to indicating an extent to which a video advertisement retains a viewer. A quality metric may be indicated, expressed, or represented in any number of manners. One example advertisement quality metric is a continuation rate (or retention rate). A continuation rate provides an indication, value, or representation of an extent to which a video advertisement is retentive. In other words, a continuation rate refers to a probability that a viewer will view a video advertisement and continue to view a subsequent portion of the video following the video advertisement. In some cases, the probability may be indicative that the viewer will view any portion of the video following completion of the video advertisement. In other cases, the probability may be indicative that the viewer will view a subsequent video advertisement or complete viewing the entire video. Although embodiments described herein generally discuss the advertisement quality manager 212 as determining continuation rates, it can be appreciated that advertisement quality can be represented in any other number of ways. Further, continuation rates can be determined in any number of manners, some of which are described below with continued reference to the advertisement quality manager.

As illustrated in FIG. 2, the advertisement quality manager 212 includes a data referencing component 220, a quality model generating component 222, a quality determining component 224, and a data store 226. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The data referencing component 220 is configured to reference video advertisement data. As used herein, generally, referencing can refer to any manner of receiving, retrieving, obtaining, or otherwise accessing data (e.g., video advertisement data, pricing data, etc.). Video advertisement data refers to any data associated with a video advertisement, or presentation thereof. Video advertisement data can represent various characteristics, aspects, or features associated with a video advertisement or presentation of the video advertisement. Various characteristics that may describe a video advertisement or the presentation thereof include, for example advertisement characteristics, video characteristics, session characteristics, and viewer characteristics. Advertisement characteristics refer to a set of variables that indicate information about an industry of the advertiser, duration of the advertisement, and/or content information of the advertisement. Video characteristics refer to a set of variables that indicate a genre of the video, a duration of the video, a rating of the video, and/or a language of the video. Session characteristics refer to a set of variables that indicate when a video was requested, such as a day of the week or a time of day, a position of the video advertisement (e.g., pre-roll, mid-roll, or post-roll), whether an advertisement was clicked on or clickable, etc. Viewer characteristics refer to a set of variables that indicate a number of times a viewer has seen the video advertisement, viewer demographics, advertisement viewing habits, etc. The features are only exemplary in nature and are not intended to be exhaustive. As such, various types of data indicating advertisement characteristics, video characteristics, session characteristics, and viewer characteristics can be collected and referenced by the data referencing component 220.

Video advertisement data collected by the data referencing component 220 can also include an indication as to whether a viewer discontinued viewing a subsequent portion of the video following the video advertisement. In this regard, a continuation indicator can be collected indicating whether the viewer continued viewing the video or whether the viewer exited the video during the presentation of the advertisement. Although the continuation indicator described herein refers to whether the viewer continued watching following the video advertisement or discontinued during the video advertisement, as can be appreciated, other thresholds or values may be used as a continuation indicator. For example, a continuation indicator may represent whether a threshold amount of video was viewed following a video advertisement, whether an entire video was viewed following a video advertisement, or the like.

As can be appreciated, a continuation indicator can be collected in association with other video advertisement data that corresponds with an indication of whether a viewer continued watching a video following an advertisement. For example, advertisement characteristics, video characteristics, session characteristics, viewer characteristics, and a continuation indicator corresponding with presentation of a video can be collected and stored in association with one another.

The video advertisement data can be collected in any number of manners. In some cases, video advertisement data is collected upon viewers previously viewing a video having video advertisements. For example, in accordance with a viewer viewing a video having video advertisements via user device 106, video advertisement data can be received and collected at the video advertisement platform 108. As another example, test cases might be performed in order to collect such data. In other cases, video advertisement data can be collected based on input by an advertiser and/or publisher. In this regard, an advertiser of advertiser device 102 or a publisher of publisher device 104 can provide input (e.g., via a web or application portal) indicating video advertisement data (e.g., the length of the advertisement, the length of the video, the number of available advertisement slots, the position of the video advertisement within the video, etc.). Further, viewer characteristics may be collected based on a viewer profile created by a viewer or learned based on viewer preferences.

The video advertisement data may be collected and stored in a data store, such as data store 226. Although only a single data store 226 is illustrated, any number of data stores can be used. Further, such a data store, or set of data stores, can be provided in any number of devices, components, or systems. In this regard, one data store with data may be stored in association with a publisher device accessible by the video advertisement platform, or one data stored may be stored in association with an advertiser device accessible by the video advertisement platform.

The quality model generating component 222 is configured to generate a quality model that can be used for determining an advertisement quality metric. As such, a quality model is generated in an effort to be able to accurately predict retention capability of a video advertisement. To generate a quality model, historical data related to video advertisements can be accessed. As such, video advertisement data associated with various video advertisements can be referenced and used to generate a model. Using the video advertisement data, an extent of contribution from various characteristic variables can be derived from the data. For example, an extent of contribution related to advertisement position, advertisement length, video length, etc. can be derived. To do so, a continuation indicator previously described can be represented as a binary (i.e., one or zero) dependent variable in a logistic regression model to derive coefficients or weights that indicate an extent of contribution of various characteristic variables. As such, logistic regression is used to identify weights for characteristic features that influence a viewer decision of whether to exit a video or continue watching a video during a video advertisement.

As described herein, the quality model generating component 222 can generate a model for determining continuation rates that provides an indication of an extent to which a video advertisement has retentive capabilities. In other words, a generated quality model can indicate a probability that a viewer will view a video advertisement and continue to view a subsequent portion of the video following the video advertisement. By way of example, various video advertisement data, such as variables of advertisement characteristics, video characteristics, session characteristics, and viewer characteristics can be input into a logistic regression model along with continuation indicators as dependent variable to derive coefficients or weights for characteristic variables (e.g., duration of the ad, duration of the video, genre of the video, position in the video, etc.).

One example of a quality model that determines continuation rates includes:

$$\hat{c}_i = 1 - \frac{1}{N_i} \sum_{1}^{N_i} \frac{e^{(\hat{\alpha}_i + X_{vi} \cdot \hat{\gamma})}}{1 + e^{(\hat{\alpha}_i + X_{vi} \cdot \hat{\gamma})}} \qquad \text{Equation 1}$$

wherein, $\hat{c}_i$ indicates the continuation rate, $N_i$ indicates the number of times that video advertisement i has been watched by viewers, $X_{vi}$ indicates a matrix of explanatory variables that might affect the continuat rates, $\hat{\gamma}$ indicates a vector of coefficients, and $\hat{\alpha}_i$ indicates utility obtained by a viewer from intrinsic features of an advertisement i. The coefficients can be estimated using a maximum likelihood function given by:

$$L = \pi_{vi} Pr[d_{vi}=1]^{d_{vi}} \times Pr[d_{vi}=0]^{(1-d_{vi})} \qquad \text{Equation 2}$$

wherein the probability of exiting during an ad is given by:

$$Pr[d_{vi} = 1] = \frac{e^{(\alpha_i + X_{vi} \cdot \gamma)}}{1 + e^{(\alpha_i + X_{vi} \cdot \gamma)}} \qquad \text{Equation 3}$$

using a dependent variable $d_{vi}$ that equals 1 if a viewer exits during the advertisements and 0 if the viewer continues to a subsequent portion of the video.

Upon generating a quality model, a quality metric, such as continuation rate can be determined for video advertisements via the quality determining component 224. For example, a continuation rate model, as indicated in Equation 1 described above along with estimated variable coefficients derived based on historical data, can be used to calculate continuation rates of various video advertisements. Video advertisement quality, such as continuation rates, can be determined for any number of video advertisements. For example, advertisement quality might be generated for any video advertisement accessible by the video advertisement platform 108. As another example, advertisement quality might be generated for video advertisements designated by an advertiser or publisher. Further, the quality determining component 224 can be configured to generate continuation rates in real time, that is, as requested. For example, in operation, a user at a user device may request to view a video. Upon a request to view a video, advertisement quality associated with potential video advertisements to supplement the video can be determined.

The quality determining component 224 can store and/or provide quality metrics, such as continuation rates, to a requesting component. For example, quality metrics may be used by the video advertisement platform 108, provided to the publisher device 204, provided to the advertiser device, etc. Quality metrics can be used in any number of manners. As described with reference to FIG. 3, quality metrics can be used to select and/or position video advertisements for videos. Quality metrics could also be employed by an advertiser to evaluate the retentiveness of advertisements and/or facilitate creation of more retentive advertisements. Quality metrics may also provide a publisher a statistical sense of what variables affect a viewer's decision to finish watching a video. Any number of uses can be contemplated with respect to quality metrics described herein.

Figure 3:
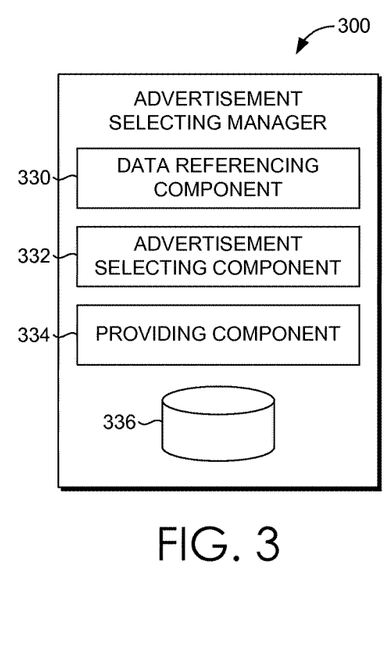
FIG. 3 is a block diagram of an advertisement selecting manager, in accordance with embodiments of the present invention.

Turning now to FIG. 3, FIG. 3 illustrates an exemplary advertisement selecting manager 314. As described, the advertisement selecting manager 314 is configured to select video advertisements for presentation in association with a video using advertisement quality. Advertisement quality can have a significant effect on the retention and perceived quality of subsequent advertisements. A highly engaging advertisement can increase viewer retention in a video while an inferior advertisement can cause a viewer to leave a video session or even the publisher's site or application. For example, assume a video advertisement that is uninteresting to a viewer is initially presented. In such a case, the viewer may discontinue watching the video and, as such, remaining video advertisements are not presented to the viewer resulting in a loss of revenue. As such, ad quality is an important factor in selecting advertisements for presentation in association with a video. Also, the retention of viewers during a video advertisement, in addition to its own quality or retention power, could be further affected by the quality of the video advertisements shown before in the same video session. So the quality of a video advertisement can have a cascading impact on the subsequent advertisements in the same video session.

As illustrated in FIG. 3, the advertisement selecting manager 314 includes a data referencing component 330, an advertisement selecting component 332, a providing component 334, and a data store 338. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The data referencing component 330 is configured to reference advertisement selection data. Advertisement selection data refers to any data that can be used to select a video advertisement(s) for presentation with a video. By way of example only, and without limitation, advertisement selection data may include an indication of advertisement quality (e.g., continuation rate(s)), an advertisement cost(s), a slot-specific continuation rate(s), a linear decrease of slot-specific continuation rates(s), an indication of a video(s), an indication of a video advertisement(s), a number of slots within a video available for video advertisement placement, a position of slots within a video (e.g., pre-roll, mid-roll, post-roll), or the like. Such data might be provided or collected in any manner. For example, a publisher may provide or indicate a number of slots and a position of slots, while an advertiser may provide an advertisement cost.

Advertisement selection data may be referenced at any time. In some cases, advertisement selection data might be referenced in accordance with a viewer selection to view a video. In this regard, upon a user selecting to view a particular video, advertisement selection data can be referenced such that one or more video advertisements can be selected for presentation in association with the video.

The advertisement selection data may be collected and stored in a data store, such as data store 336. Although only a single data store 336 is illustrated, any number of data stores can be used. Further, such a data store, or set of data stores, can be provided in any number of devices, components, or systems. In this regard, one data store with data may be stored in association with a publisher device accessible by the video advertisement platform, or one data stored may be stored in association with an advertiser device accessible by the video advertisement platform.

The advertisement selecting component 332 is configured select one or more video advertisements for presentation in association with a video. As described herein, the advertisement selecting component 332 utilizes quality metrics, such as continuation rates, to makes such a selection. In one embodiment, selection of video advertisements might be based solely on quality metrics. For example, a quality metric associated with a greatest capability of retaining a viewer may be selected for a first advertisement slot in the video, and a quality metric associated with a next greatest capability of retaining a viewer may be selected for a second advertisement slot in the video, and so on.

In other embodiments, advertisement costs can be considered in combination with quality metrics to select video advertisements for display in association with a video. An advertisement cost refers to a cost or price that is intended to be paid in association with presentation (or some action) associated with the video advertisement. One exemplary advertisement cost frequently used is CPM, which is cost per mille or cost per thousand impressions. In many cases, an advertiser may negotiate a CPM with a publisher. CPM is only one example of an advertisement cost that might be used in combination with quality metrics to select video advertisements for display with a video.

Utilizing a combination of quality metrics and advertisement costs to facilitate advertisement selection can occur in any number of manners. By way of example only, and without limitation, one implementation might arrange video advertisements into a descending order of advertisements based on the following equation used for each advertisement:

$$\frac{b_i \cdot c_i}{1 - c_i} \qquad \text{Equation 4}$$

wherein $b_i$ refer to advertisement costs for advertisement i, and $c_i$ refers to continuation rate for advertisement i. The descending order can then be provided to a dynamic program used to select video advertisements for presentation in association with a video.

Because the retention during and/or following presentation of a video advertisement can be impacted by the slot position in which the video advertisement is presented (e.g., pre-roll, mid-roll, post-roll), a slot factor can be used along with a quality metric and advertisement cost to select a video advertisement(s) for presentation with a video. Generally, a slot factor refers to a factor that accounts for a slot position or placement of a video advertisement. A slot factor may refer to a slot-specific continuation probability that can be represented as $\lambda_j$, for slot j. A slot-specific continuation probability may generally refer to a probability indicating whether a viewer watches an advertisement given that the viewer has watched an ad in a previous slot(s). The slot factor can be independent of the quality of the advertisement in that slot. As advertisement continuation rates may not be calculated specific to slots, such a slot-specific continuation probability can scale each continuate rate and facilitate forming continuation rates of advertisements specific to each slot.

In one implementation, an advertisement selection algorithm is used that assumes decreasing slot-specific continuation probabilities. In this implementation, it is assumed that retention in advertisements decreases almost linearly from the pre-roll to the post-roll. Because it is assumed that the retention is linearly decreasing across all slots, a constant $\alpha$ can be created, which is a ratio between the slot-specific continuation rate of the next slot compared to a present slot:

$$\alpha = \lambda_{j+1}/\lambda_j \qquad \text{Equation 5}$$

The constant $\alpha$ can be used to determine a slot-adjusted CPM represented as:

$$\frac{b_i \cdot c_i}{1 - \alpha \cdot c_i} \qquad \text{Equation 6}$$

Generally, a slot-adjusted CPM refers to a cost or price of an impression multiplied by the inverse of the negative effect of the advertisement. The slot-adjusted CPM is a combined measure of advertisement cost and quality of the advertisement taking into account advertisement placement when slot-specific continuation rates are assumed to linearly decrease.

A slot-adjusted CPM can be determined for various advertisements. In one implementation, beginning with a first slot, an advertisement with a highest slot-adjusted CPM among advertisements is selected for the first slot. This continues until advertisements have been selected for each of the advertisement slots. In another implementation, a dynamic programming method can be used that is designed to identify an optimal allocation of vide advertisements that maximizes the revenue for the publisher from a video session. The dynamic program can iterate over all possible combinations after arranging the video advertisements according to decreasing order of slot-adjusted CPM to find the optimal allocation. For example, the advertisements can be sorted by descending order of the corresponding slot-adjusted CPM. Thereafter, revenue can be computed through a dynamic program using the following equation:

$$R[i,j] = \max\{R(i+1,j), b_i \cdot c_i \cdot \lambda_j + R(i+1,j+1) \cdot c_i\} \qquad \text{Equation 7}$$

Selection of the advertisements and corresponding slot positions can be performed together or at the same time, generally resulting in a greater optimization. In some cases, once an advertisement has been selected for a slot, the same advertisement cannot be chosen again for another subsequent slot.

In another implementation, an advertisement selection algorithm is used that does not assume that the slot-specific continuation probability is monotonically decreasing over the course of a video. In some cases, where there are multiple mid-rolls, the first few mid-roll slots may have higher slot-specific continuation probabilities than both pre-roll and post-roll. However, the slot-specific continuation probabilities for the mid-rolls may exhibit a linearly decreasing trend. As such a scenario, a two-step heuristic algorithm can be used. Generally, for an inventory of advertisements denoted by N, the first step is to solve the sub-problem of which advertisements to place in the mid-roll slots and the set of advertisements chosen are denoted as A. This step can be solved by exploiting the linearly decreasing monotonicity of the slot-specific probabilities of mid-roll slots, as described above. In applying a second step, appropriate advertisements to present can be determined in the pre-roll and post-roll slots. To do so, in one embodiment, combinations of advertisements can be applied (e.g., exhaustively) in the first slot (pre-roll). For each advertisement a that is shown in the first slot, if $a \notin A$, then the advertisement with maximum revenue in the set $N-A-\{a\}$ is assigned as $a_j$ (post-roll ad), otherwise if $a \in A$, then the advertisement with maximum revenue in the set $N-A'-\{a\}$ is assigned as $a_j$ (post-roll ad). For every advertisement a, the configuration chosen is given by $(a, a2, \ldots aj-1, aj)$ if $a \notin A$, otherwise the configuration is given by $(a, a_2', \ldots, a_{j-1}', a_j)$ if $a \in A$, and the resulting expected revenue is denoted by $R_a$. An advertisement associated with a greatest revenue can be selected, particularly since the continuation probability at this point is negligible to irrelevant. The configuration with a maximum revenue can then be selected.

The providing component 334 is generally configured to provide the selected advertisements, or an indication thereof. In some cases, the providing component 334 might provide an indication of the selected advertisements to another component or system, such as the publisher device 104. In such a case, the component that receives the indication of the selected advertisements might access the advertisements and integrate the advertisements into the corresponding advertisement slots within a video. In other cases, the providing component 334 might reference the selected advertisements and the video into which the advertisements are to be presented. The providing component 334 may then aggregate or supplement the video with the selected advertisement(s) and provide the video to the viewer at the user device 106 that requested to view the video. Any number of implementations may exist, and the invention is not intended to be limited to any such environment in which advertisements and/or videos are provided for viewing by a viewer.

Figure 4:
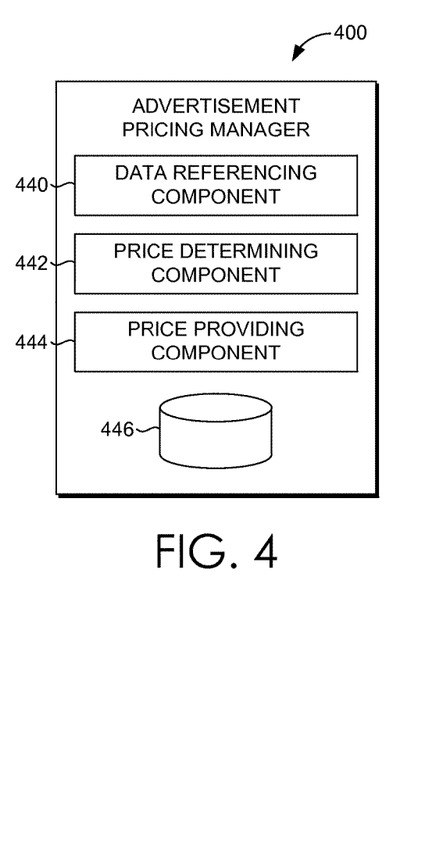
FIG. 4 is a block diagram of an advertisement pricing manager in accordance with an embodiment of the present invention.

Turning now to FIG. 4, FIG. 4 illustrates an exemplary advertisement pricing manager 416. As described, the advertisement pricing manager 416 is configured to provide pricing or cost information to an advertiser based on performance of an advertisement. In embodiments described herein, a pricing scheme is provided based on a combined metric of advertisement costs and advertisement quality. In this regard, advertisement costs and advertisement quality are used to determine a new, generally discounted, cost to charge the advertiser for presentation of a video advertisement in a video.

As illustrated in FIG. 4, the advertisement pricing manager 416 includes a data referencing component 440, a price determining component 442, a price providing 444, and a data store 446. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The data referencing component 440 is configured to reference pricing data. Pricing data refers to any data that can be used to determine a price to charge an advertiser for presentation of an advertisement within a video. By way of example only, and without limitation, pricing data may include an indication of an advertisement cost, such as a negotiated CPM. Such data might be provided or collected in any manner. For example, an advertiser may provide or indicate an advertisement cost. Pricing data can be referenced in any manner, such as retrieving, receiving, obtaining, or otherwise accessing the pricing data.

Pricing data may be referenced at any time. In some cases, pricing data might be referenced in accordance with a presentation of a video advertisement in association with a video. In this regard, upon a viewer viewing a video advertisement placed at some point within a video, pricing data may be referenced to determine a price to charge the advertiser for such presentation.

The pricing data may be collected and stored in a data store, such as data store 446. Although only a single data store 446 is illustrated, any number of data stores can be used. Further, such a data store, or set of data stores, can be provided in any number of devices, components, or systems. In this regard, one data store with data may be stored in association with a publisher device accessible by the video advertisement platform, or one data stored may be stored in association with an advertiser device accessible by the video advertisement platform.

The price determining component 442 is configured to determine a price for presentation of a video advertisement in association with a video. At a high level, one implementation of the pricing determining component determines the value of an advertisement by removing the advertisement and slot in which the advertisement was placed. The difference between the values with the advertisement and without the advertisement can provide the value associated with the advertisement. Generally, the pricing for advertisements selected pre-roll will be higher, and the pricing for advertisements selected post-roll will be lower. Such a pricing scheme can charge an advertiser an amount equal to the consequence (e.g., externality) the advertiser imposes on the publisher due to a terminated video session during the presentation of the advertiser's advertisement. In this way, a pricing scheme can charge an advertiser for the lost opportunity for the publisher to earn revenue from advertisements which were scheduled in slots subsequent to the video advertisement presented that resulted in termination of that video session.

In one embodiment, a Vickery-Clarke-Grove (VCG) pricing scheme is applied. Utilization of VCG can reward the advertiser for a positive externality (e.g., positive effect or benefit realized by a third party resulting from a transaction in which the third-party had no direct involvement) that an advertisement creates, an advertiser can gain as the new price is typically less than a negotiated CPM, and a publisher gains as an advertiser will likely avoid under-quoting and stating a reservation price. A price for advertisement $a_i$, based on VCG, can be determined using the below equation:

$$b_{ij}^{VCG} = \frac{R_{N-i}^{J} - R_{N-i}^{J-j}}{C_j \lambda_j}$$ Equation 8 wherein $b_{ij}^{VCG}$ indicates a price to be billed to an advertiser when an advertisement i is shown in slot j. $R_{N-i}^{J}$ indicates a maximum expected revenue without advertisement $a_i$ in the inventory. $R_{N-i}^{J-j}$ indicates an optimal solution without advertisement $a_i$ in the inventory and without slot j in the allocation sequence. $C_j$ indicates a cascade probability until slot j, and $\lambda_j$ indicates slot-specific continuation probabilities.

By way of example only, assume four advertisements are potential advertisements as illustrated in the below table:

TABLE 1

Illustrative Potential Advertisements

| Advertisements | Continuation Rates | Price | Adjusted Price (VCG) |
| --- | --- | --- | --- |
| A1 | 0.9 | 100 | 73 |
| A2 | 0.8 | 110 | 103 |
| A3 | 0.85 | 105 | NA |
| A4 | 0.74 | 120 | 119 |
| A5 | 0.75 | 115 | NA |

Further assume that advertisements A1, A2, and A4 are selected for advertisement slots 1, 2, and 3, respectively. As shown, reduction in the quoted price is the highest for the first advertisement, A1, as the continuation factor of advertisement A1 affects the continuation of the viewers through the next two advertisements as well. The reduction in price is the least for advertisement A4 as this is the last advertisement presented and has no impact on other the presentation of other advertisements in the video session. Accordingly, the new price of an advertisement is calculated specific to a slot in a video session.

In embodiments, because the price calculation is completed after the allocation of advertisements for a certain video has been made, the computation time of the optimal assignment is not impacted. Prices for an advertisement shown in different videos over a stipulated time (a week or a month) could be calculated from the new formula, and the advertiser may be charged a cumulative price for the number of impressions of the advertisement that has been shown in that time period. Generally, the advertiser gains each time an advertisement is selected as the new price is less than a prior negotiated price. As such, once a publisher meets a target number of impressions for an advertisement, the overall price charged to the advertiser will be less than the campaign budget the advertiser would have set. Such a pricing mechanism should provide an incentive to advertisers to quote its reservation price because a lower quote may lead to de-selection of the advertisement or demotion in slot position.

Figure 5:
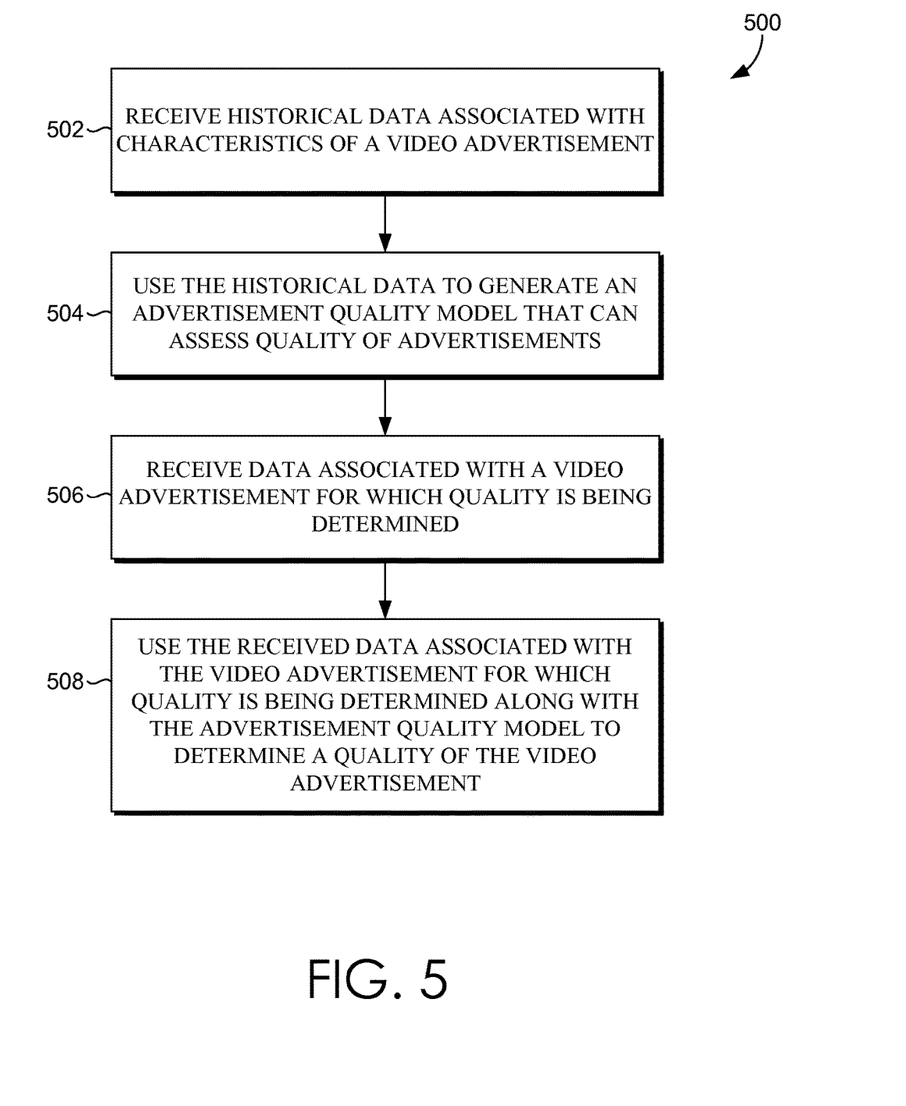
FIG. 5 is a flow diagram showing a method for facilitating determinations of advertisement quality, in accordance with an embodiment of the present invention.

Turning now to FIG. 5, a flow diagram is provided that illustrates a method 500 for facilitating determinations of video advertisement quality, in accordance with an embodiment of the present invention. Such a method can be performed, for example, at an advertisement quality manager, such as advertisement quality manager 212 of FIG. 2. Although the method 500 of FIG. 5, the method 600 of FIG. 6, and the method 700 of FIG. 7 are provided as separate methods, the methods, or aspects thereof, can be combined into a single method or combination of methods. As can be appreciated, additional or alternative steps may also be included in different embodiments.

Initially, as indicated at block 502, historical data associated with characteristics of a video advertisement, or presentation thereof, is received. The historical data can be associated with any number of presentations of videos having video advertisements. In one embodiment, historical data can include data related to video characteristics, advertisement characteristics, video session characteristics, and viewer characteristics, as well as continuation indicators indicating whether a viewer continued watching at least a portion of the video following presentation of an advertisement. At block 504, the historical data is used to generate an advertisement quality model that can assess quality of advertisements. In some embodiments, the continuation indicators are used as a dependent variable while various features associated with video characteristics, advertisement characteristics, video session characteristics, and viewer characteristics are used as independent variables in a logistic regression algorithm to determine weights or probabilities associated with each of the characteristic variables. Such weights can then be inserted into the logistic regression algorithm to generate an advertisement quality model. At block 506, data associated with a video advertisement for which quality is being determined is received. Such data can include data related to video characteristics, advertisement characteristics, video session characteristics, and viewer characteristics. Thereafter, at block 508, the received data associated with the video advertisement for which quality is being determined is used along with the advertisement quality model to determine a quality of the video advertisement. In embodiments, the quality of the video advertisement can be determined as a continuation rate that indicates a likelihood a viewer will continue viewing a video following presentation of the video advertisement.

Figure 6:
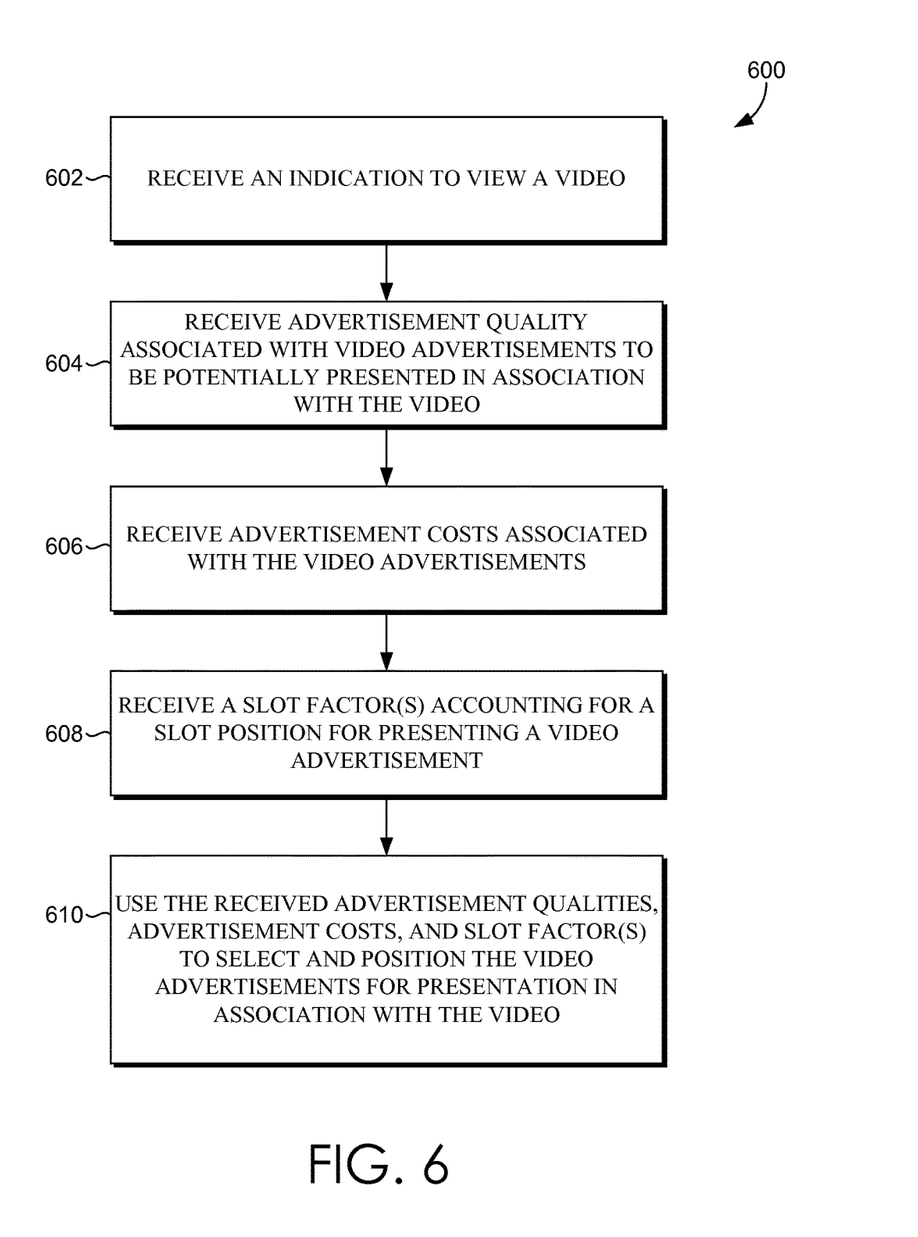
FIG. 6 is a flow diagram showing a method for facilitating selecting video advertisements, in accordance with an embodiment of the present invention.
Figure 7:
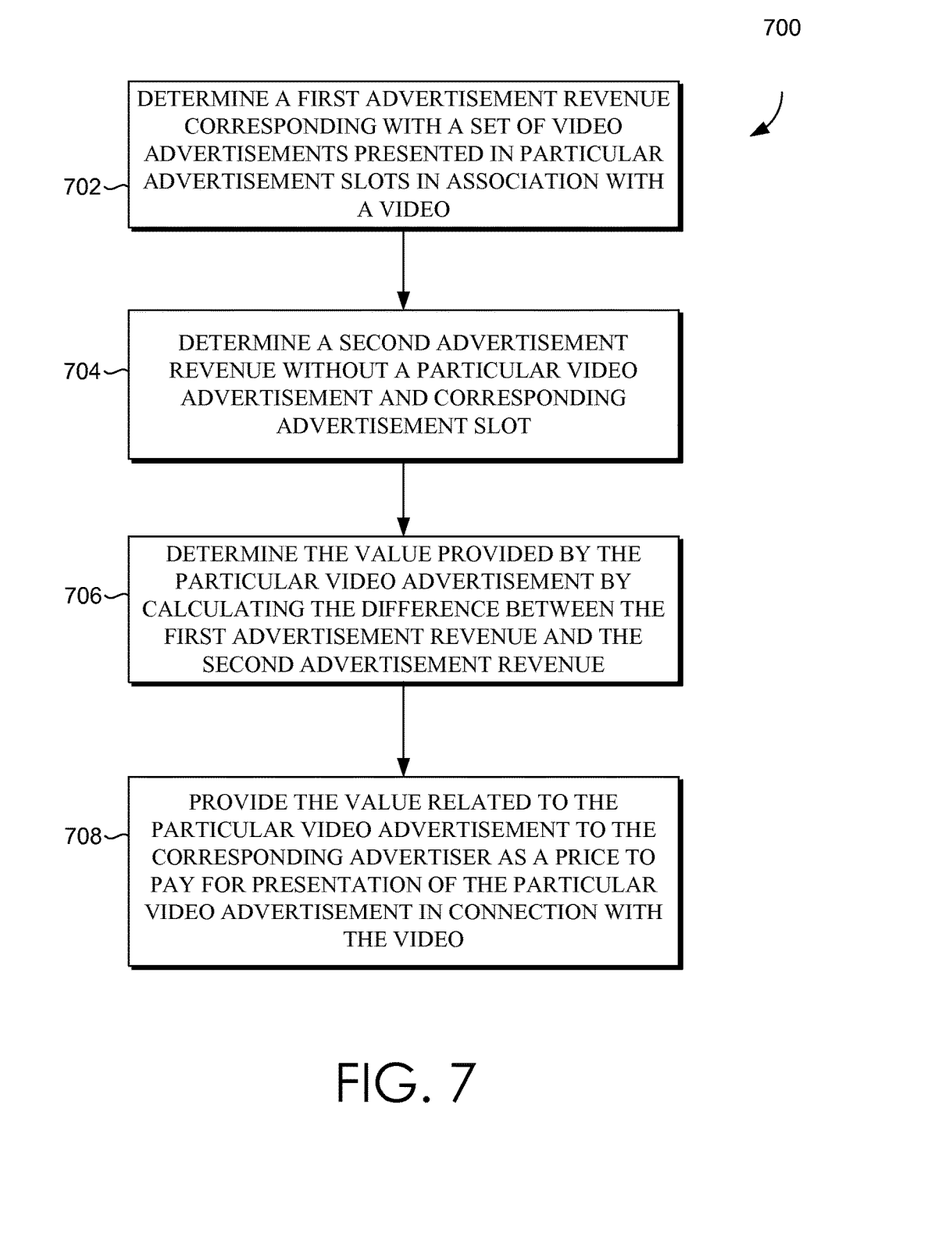
FIG. 7 is a flow diagram showing a method for facilitating pricing of video advertisements, in accordance with embodiments of the present invention.

With respect to FIG. 6, a flow diagram is provided that illustrates a method 600 for selecting video advertisements based on advertisement quality, in accordance with an embodiment of the present invention. Such a method can be performed, for example, at an advertisement selecting manager, such as advertisement selecting manager 314 of FIG. 3. Initially, at block 602, an indication to view a video is received. As can be appreciated, the video may have a specific number of slots available for presenting video advertisements disbursed throughout presentation of the video (e.g., pre-roll, mid-roll, post-roll). At block 604, advertisement quality associated with video advertisements to be potentially presented in association with the video is received. At block 606, advertisement costs (e.g., CPM) associated with the video advertisements are received. At block 608, a slot factor(s) accounting for a slot position for presenting a video advertisement is received. Thereafter, at block 610, the received advertisement qualities, advertisement costs, and slot factor(s) are used select a portion of the video advertisements for presentation in association with the video. By way of example, assume a video has designated three slots for video advertisements. In such a case, three video advertisements can be selected and positioned in each of the three slots using the advertisement qualities, advertisement costs, and a slot factor(s) that takes into account positioning of advertisements.

With reference to FIG. 7, a flow diagram is provided that illustrates a method 700 for facilitating advertisement pricing, in accordance with an embodiment of the present invention. Such a method can be performed, for example, at an advertisement pricing manager, such as advertisement pricing manager 416 of FIG. 4. Initially, as indicated at block 702, a first advertisement revenue corresponding with a set of video advertisements presented in particular advertisement slots in association with a video is determined. At block 704, a second advertisement revenue without a particular video advertisement and corresponding advertisement slot is determined. At block 706, the value provided by the particular video advertisement is determined by calculating the difference between the first advertisement revenue and the second advertisement revenue. At block 708, the value related to the particular video advertisement is provided to the corresponding advertiser as a price to pay for presentation of the particular video advertisement in connection with the video. As can be appreciated, in embodiments, the advertisement revenue is calculated to account for slot specific continuation probabilities.

Having described an overview of embodiments of the present invention, an exemplary computing environment in which some embodiments of the present invention may be implemented is described below in order to provide a general context for various aspects of the present invention.

Figure 8:
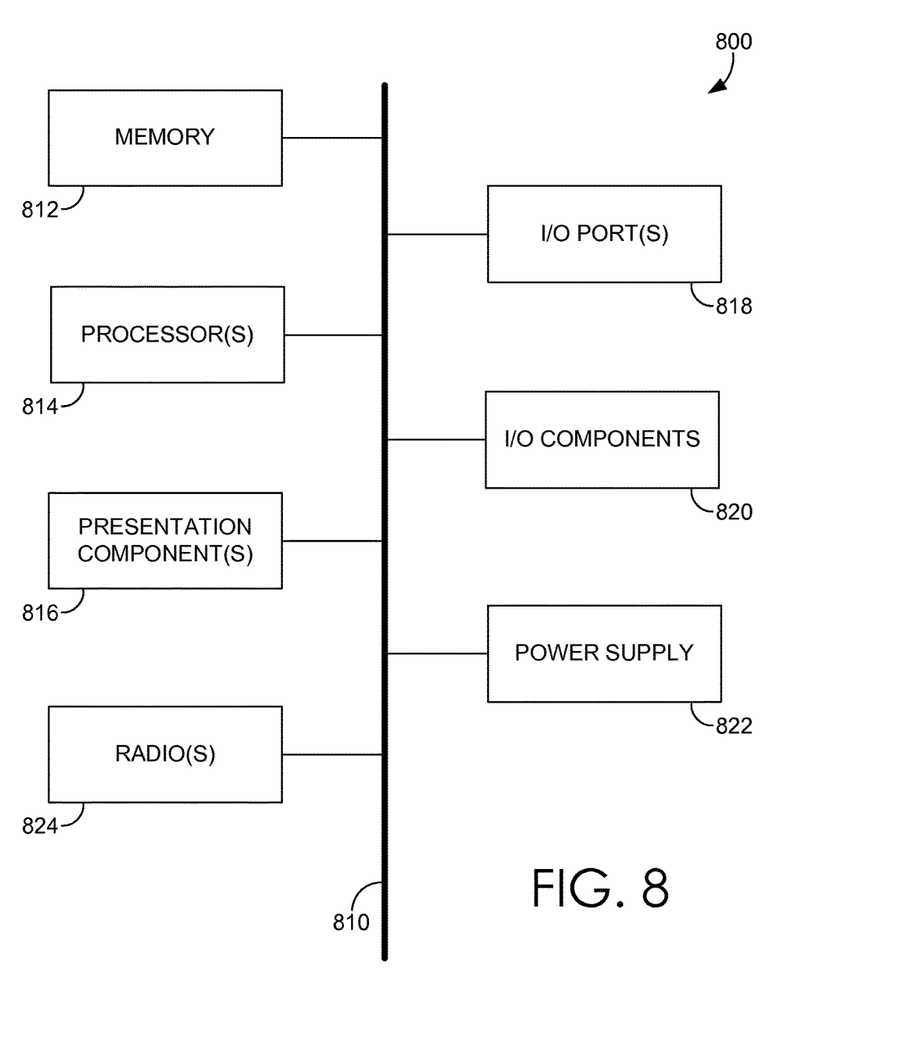
FIG. 8 is a block diagram of an exemplary computing environment in which embodiments of the invention may be employed.

Referring generally to FIG. 8, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

With reference to FIG. 8, computing device 800 includes a bus 810 that directly or indirectly couples the following devices: memory 812, one or more processors 814, one or more presentation components 816, input/output (I/O) ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterates that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as, stereoscopic camera systems, infrared camera systems, RGB camera systems, and combinations of these for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. A computer-implemented method for determining video advertisement quality, the method comprising:
obtaining video advertisement data associated with a video advertisement, the video advertisement data indicating at least one variable including at least one of an advertisement characteristic, a video characteristic, a video session characteristic, and a viewer characteristic;
determining an advertisement quality indicating a probability a viewer will view a subsequent portion of a video that plays following complete viewing of the video advertisement presented in association with the video, the advertisement quality determined using the video advertisement data associated with the video advertisement and a quality model generated from historical data related to video advertisements that includes continuation indicators, each continuation indicator representing whether a viewer watched at least a threshold amount of video following presentation of a particular video advertisement, the quality model indicating weights associated with the at least one variable; and
selecting, based on the advertisement quality, the video advertisement to be presented to the viewer in association with the video.

2. The method of claim 1, wherein the historical data related to video advertisements includes at least one of advertisement characteristics, video characteristics, video session characteristics, or viewer characteristics.

3. The method of claim 1, wherein the subsequent portion of the video comprises any extent of the video following the video advertisement.

4. The method of claim 1 further comprising selecting, based on the advertisement quality, the video advertisement for presentation in association with the video.

5. The method of claim 1, further comprising determining, based on the advertisement quality, an optimal advertisement allocation of the video advertisement in association with the video.

6. The method of claim 1, wherein the advertisement quality is provided as feedback to an advertiser to indicate quality of the video advertisement.

7. The method of claim 1, wherein the video characteristic comprises any of a genre of the video, a duration of the video, a rating of the video, or a language of the video.

8. The method of claim 1, wherein the video session characteristic comprises any of a time of a request to view the video, a day of a request to view the video, or a position of the video advertisement.

9. The method of claim 1, wherein the viewer characteristic comprises any of a demographic of the viewer, a number of instances the viewer has viewed the video advertisement, or a number of instances the viewer has viewed the video.

10. One or more non-transitory computer storage media storing computer-useable instructions that, when used by a computing device, cause the computing device to perform a method for determining quality of video advertisements, the method comprising:
accessing historical data related to continuation indicators and a set of video advertisement data related to at least one variable including at least one of a video advertisement characteristic, a video characteristic, a video session characteristic, or a viewer characteristic, wherein each continuation indicator indicates whether a viewer watched at least a threshold amount of a video following presentation of a particular video advertisement;
generating, based on the historical data related to the continuation indicators, an advertisement quality model that assesses quality of advertisements;
obtaining data associated with a video advertisement for which quality is to be determined;
determining, a quality of the video advertisement, the advertisement quality indicating a probability a viewer will view a subsequent video advertisement following presentation of the video advertisement presented in association with a video, the quality of the video advertisement determined using the data associated with the video advertisement and the quality model indicating weights associated with the at least one variable; and
selecting, based on the advertisement quality, the video advertisement to be presented to the viewer in association with the video.

11. The one or more non-transitory computer storage media of claim 10, wherein the data associated with the video advertisement for which quality is to be determined is related to at least one of the video characteristic, the advertisement characteristic, the video session characteristic, or the viewer characteristic.

12. The one or more non-transitory computer storage media of claim 10, wherein the advertisement quality model comprises a logistic regression model.

13. The one or more non-transitory computer storage media of claim 10 further comprising using the advertisement quality to select the video advertisement for presentation in association with the video.

14. The one or more non-transitory computer storage media of claim 10 further comprising providing the advertisement quality to a remote component for selecting the video advertisement for presentation in association with the video.

15. The one or more non-transitory computer storage media of claim 12, wherein the weights of the advertisement quality model are generated by:
using the continuation indicators as dependent variables and the set of video advertisement data as independent variables to generate the weights, each weight corresponding with a variable associated with the video characteristics, video session characteristics, and viewer characteristics; and
including the weights and corresponding variables in the logistic regression model.

16. A method for determining video advertisement quality, the method comprising:
obtaining first video advertisement data associated with a first video advertisement and obtaining second video advertisement data associated with a second video advertisement, the video advertisement data indicating at least one variable including any of an advertisement characteristic, a video characteristic, a video session characteristic, or a viewer characteristic;
determining a first advertisement quality associated with the first video advertisement using a quality model generated from historical data related to video advertisements that includes continuation indicators, each continuation indicator representing whether a viewer watched at least a threshold amount of video following presentation of a particular video advertisement, the quality model indicating weights associated with the at least one variable;

determining a second advertisement quality associated with the second video advertisement, using the quality model indicating weights associated with the at least one variable, wherein the first advertisement quality and the second advertisement quality indicate a probability a viewer will continue viewing a portion of a video following presentation of the corresponding video advertisement presented in association with the video; and selecting, based on the first advertisement quality and the second advertisement quality, at least one of the first video advertisement and the second video advertisement to be presented to the viewer in association with the video.

17. The method of claim 16, wherein the video characteristic comprises a genre of the video, a duration of the video, a rating of the video, or a language of the video.

18. The method of claim 16, wherein the video session characteristic comprises a time of a request to view the video, a day of a request to view the video, or a position of the video advertisement.

19. The method of claim 16, wherein the viewer characteristic comprises a demographic of the viewer, a number of instances the viewer has viewed the video advertisement, or a number of instances the viewer has viewed the video.

* * * * *